Figure 19:
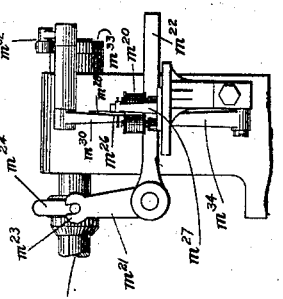

No. 687,530. Patented Nov. 26, 1901.
D. E. HUNTER.
MACHINE FOR PUNCHING, RULING, AND CUTTING CARDS, &c.
(Application filed July 5, 1900.)
(No Model.) 9 Sheets—Sheet 1.
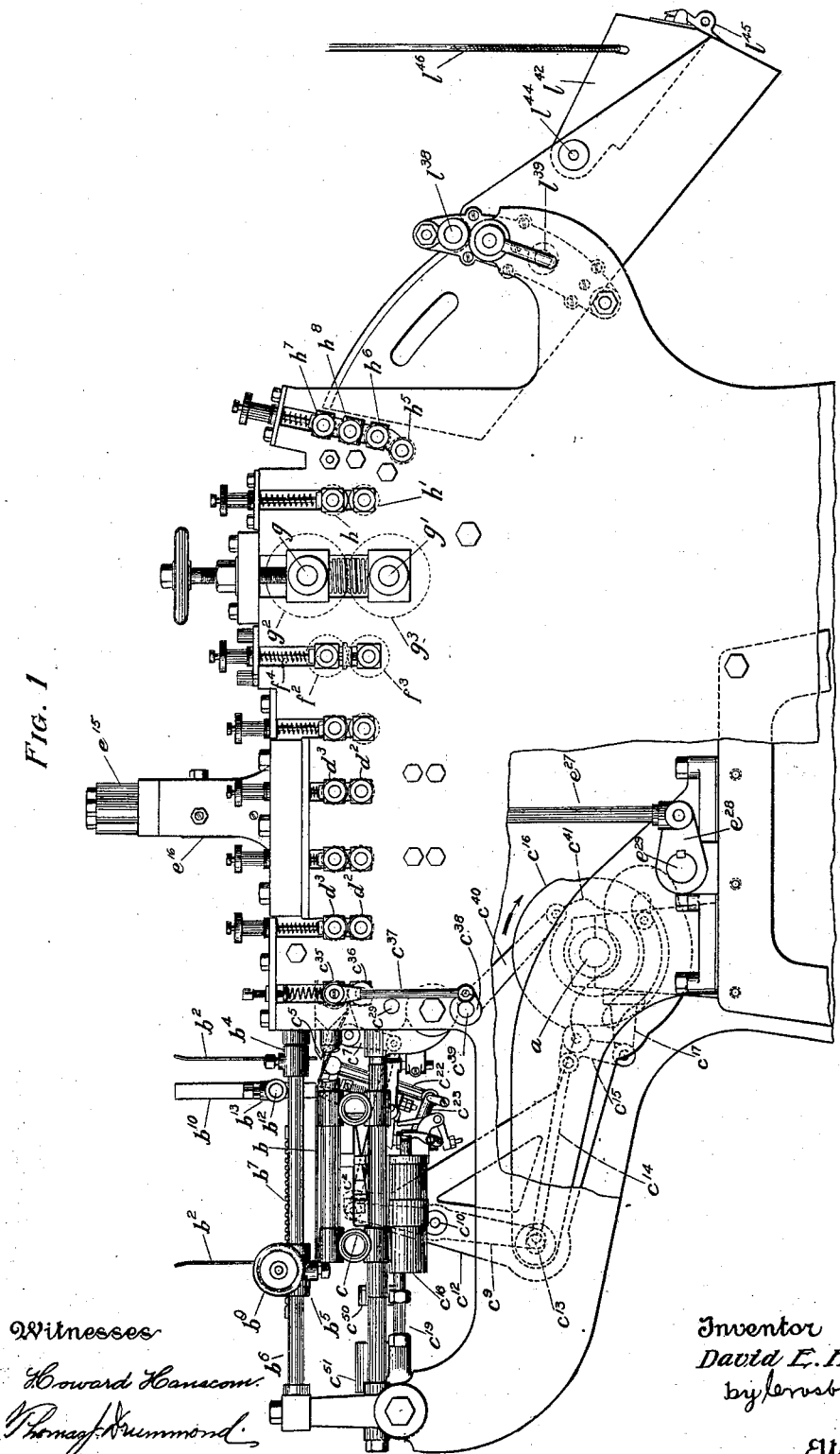
Witnesses
Howard Hanscom
Thomas F. Drummond
Inventor
David E. Hunter,
by Crosby & Gregory
Attorneys No. 687,530. Patented Nov. 26, 1901.
D. E. HUNTER.
MACHINE FOR PUNCHING, RULING, AND CUTTING CARDS, &c.
(Application filed July 5, 1900.)
(No Model.) 9 Sheets—Sheet 2.

Witnesses
Howard Hanscom
Thomas J. Drummond

Inventor
David E. Hunter
by Crosby & Gregory
Attorneys

No. 687,530. Patented Nov. 26, 1901.
D. E. HUNTER.
MACHINE FOR PUNCHING, RULING, AND CUTTING CARDS, &c.
(Application filed July 5, 1900.)
(No Model.) 9 Sheets—Sheet 3.
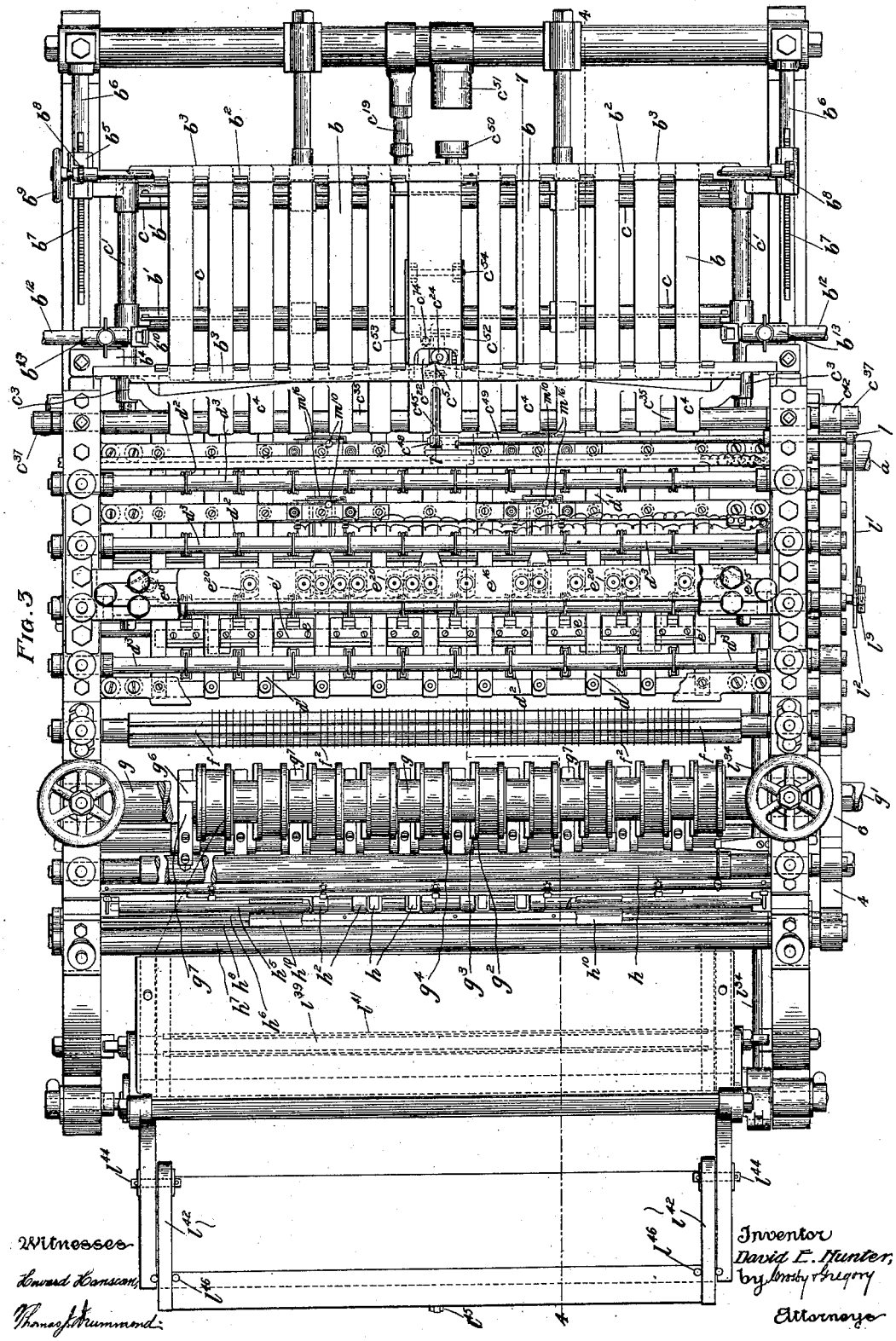

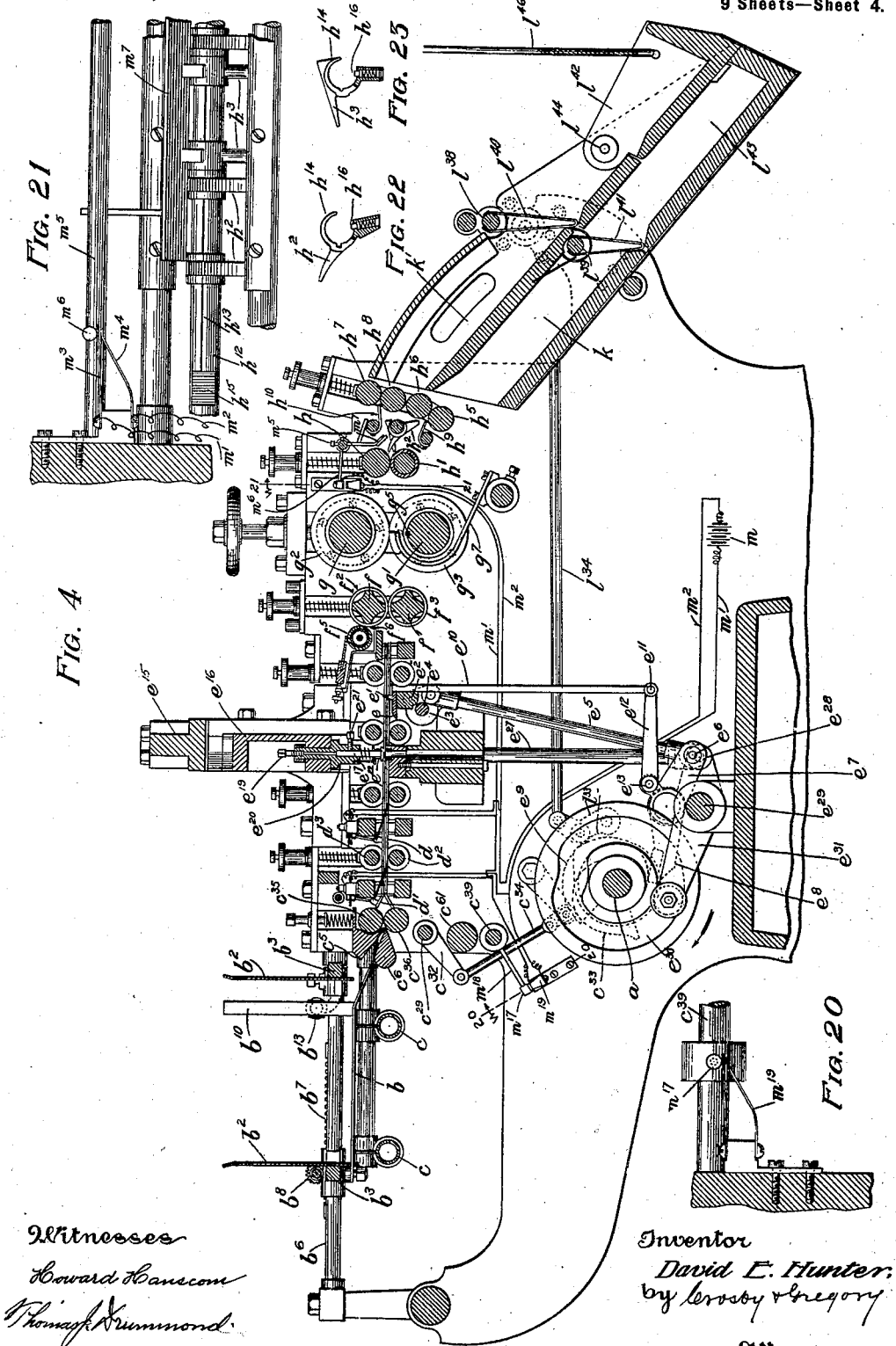

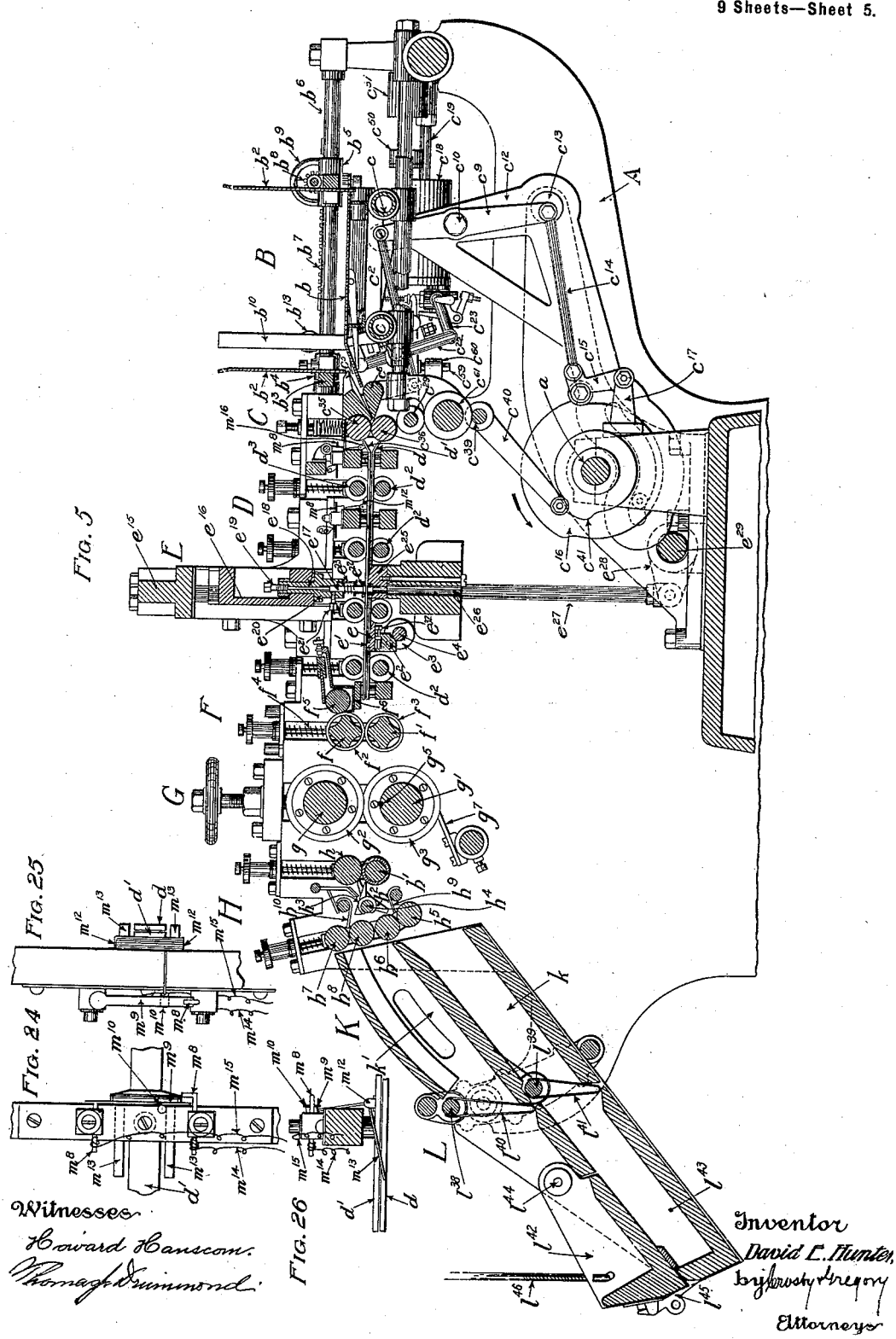

No. 687,530. Patented Nov. 26, 1901.
D. E. HUNTER.
MACHINE FOR PUNCHING, RULING, AND CUTTING CARDS, &c.
(Application filed July 5, 1900.)
(No Model.) 9 Sheets—Sheet 6.
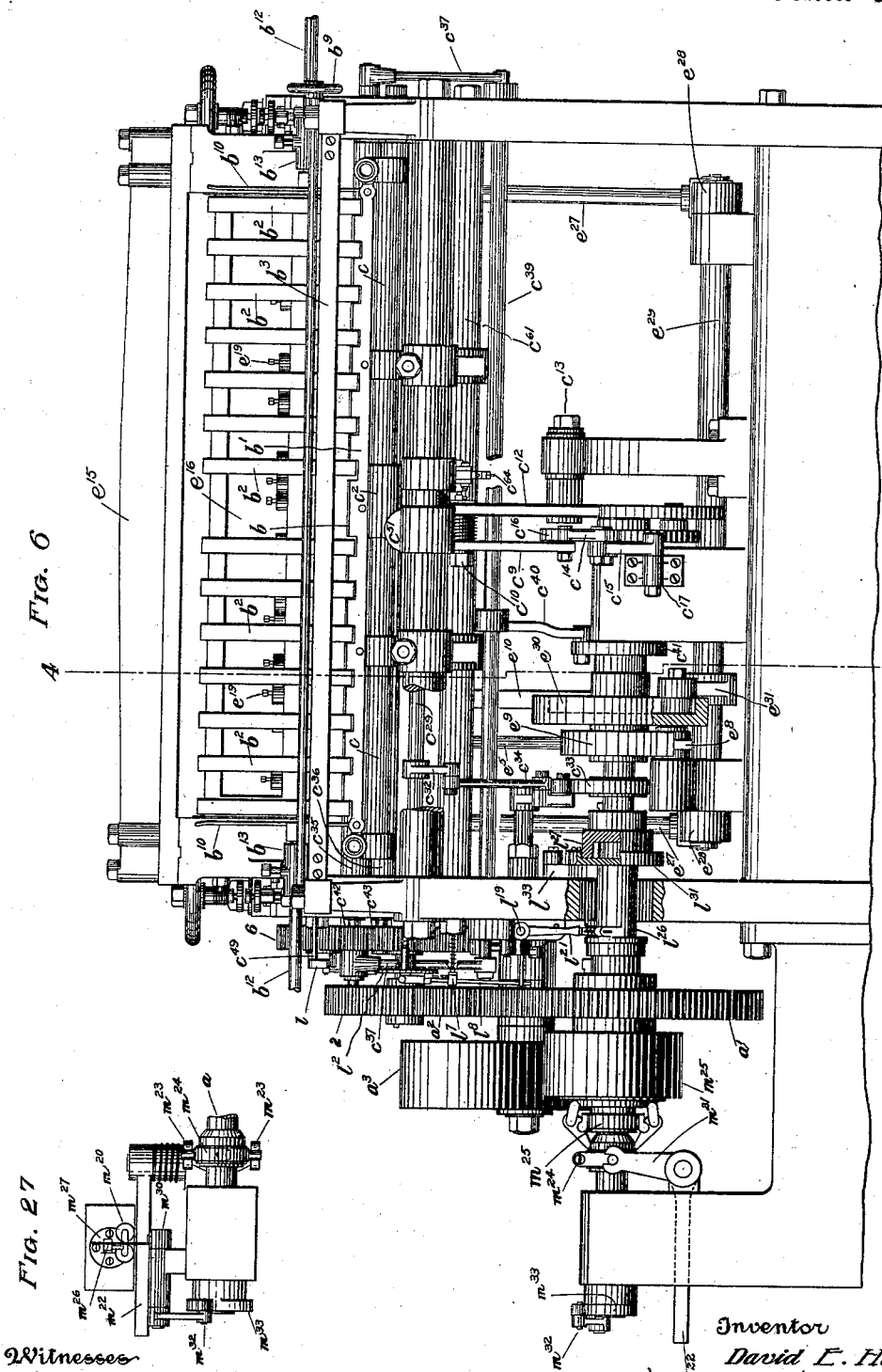

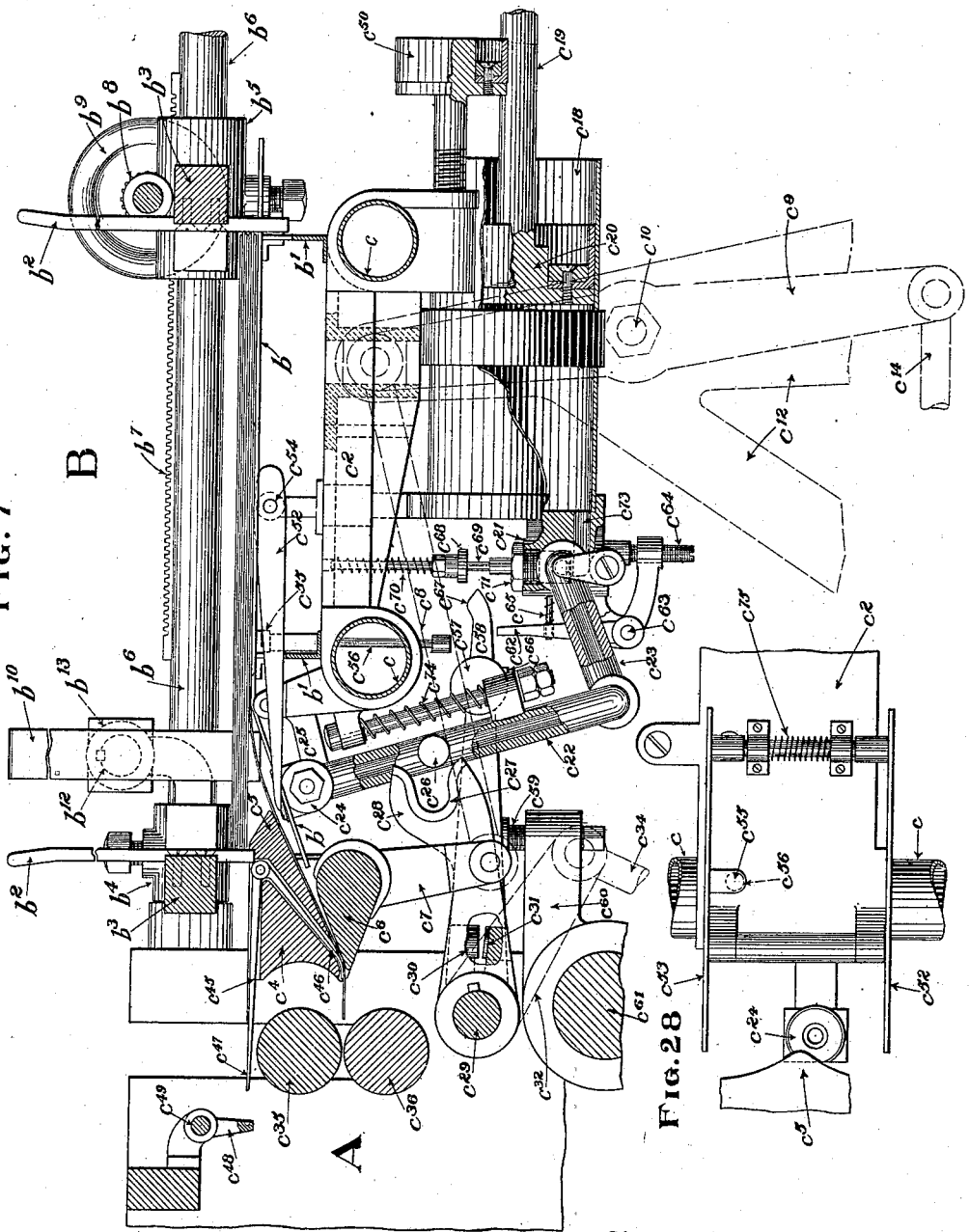

No. 687,530. Patented Nov. 26, 1901.
D. E. HUNTER.
MACHINE FOR PUNCHING, RULING, AND CUTTING CARDS, &c.
(Application filed July 5, 1900.)
(No Model.) 9 Sheets—Sheet 8.
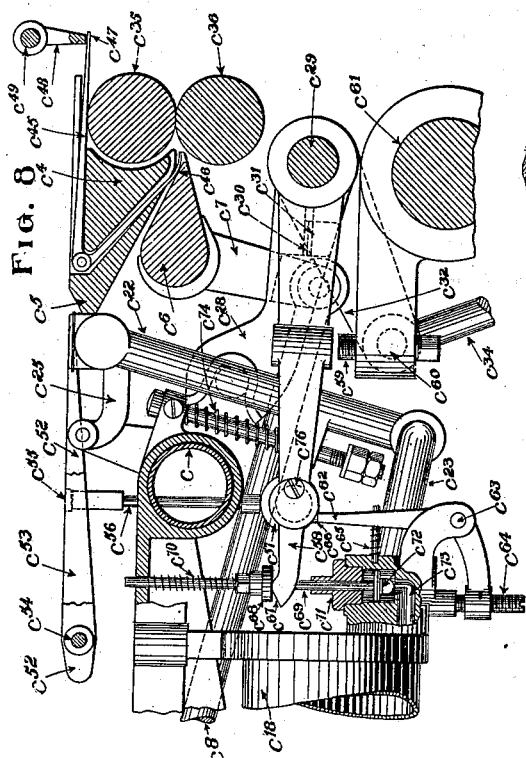
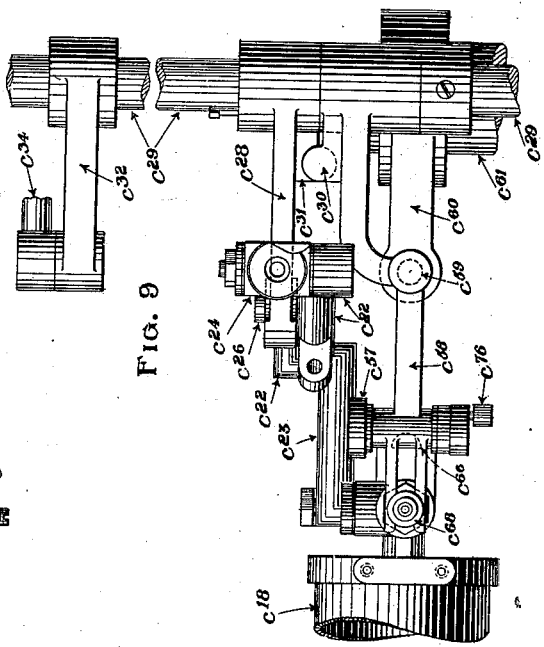
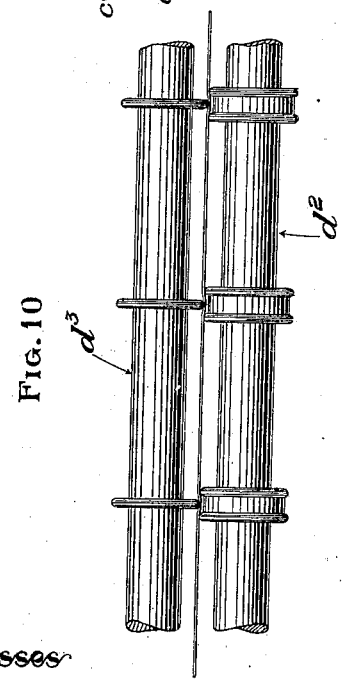
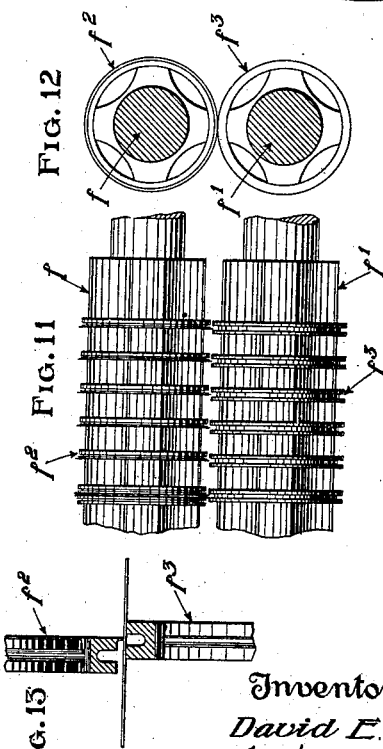
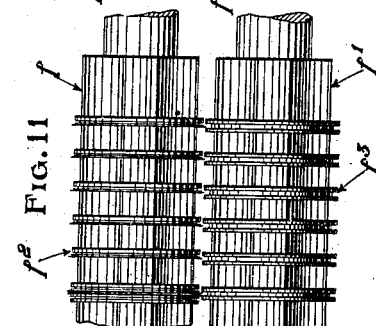
Witnesses
Howard Hanscom
Thomas J. Drummond
Inventor
David E. Hunter,
by Crosby Gregory
Attorneys No. 687,530. Patented Nov. 26, 1901.
D. E. HUNTER.
MACHINE FOR PUNCHING, RULING, AND CUTTING CARDS, &c.
(Application filed July 5, 1900.)
(No Model.) 9 Sheets—Sheet 9.
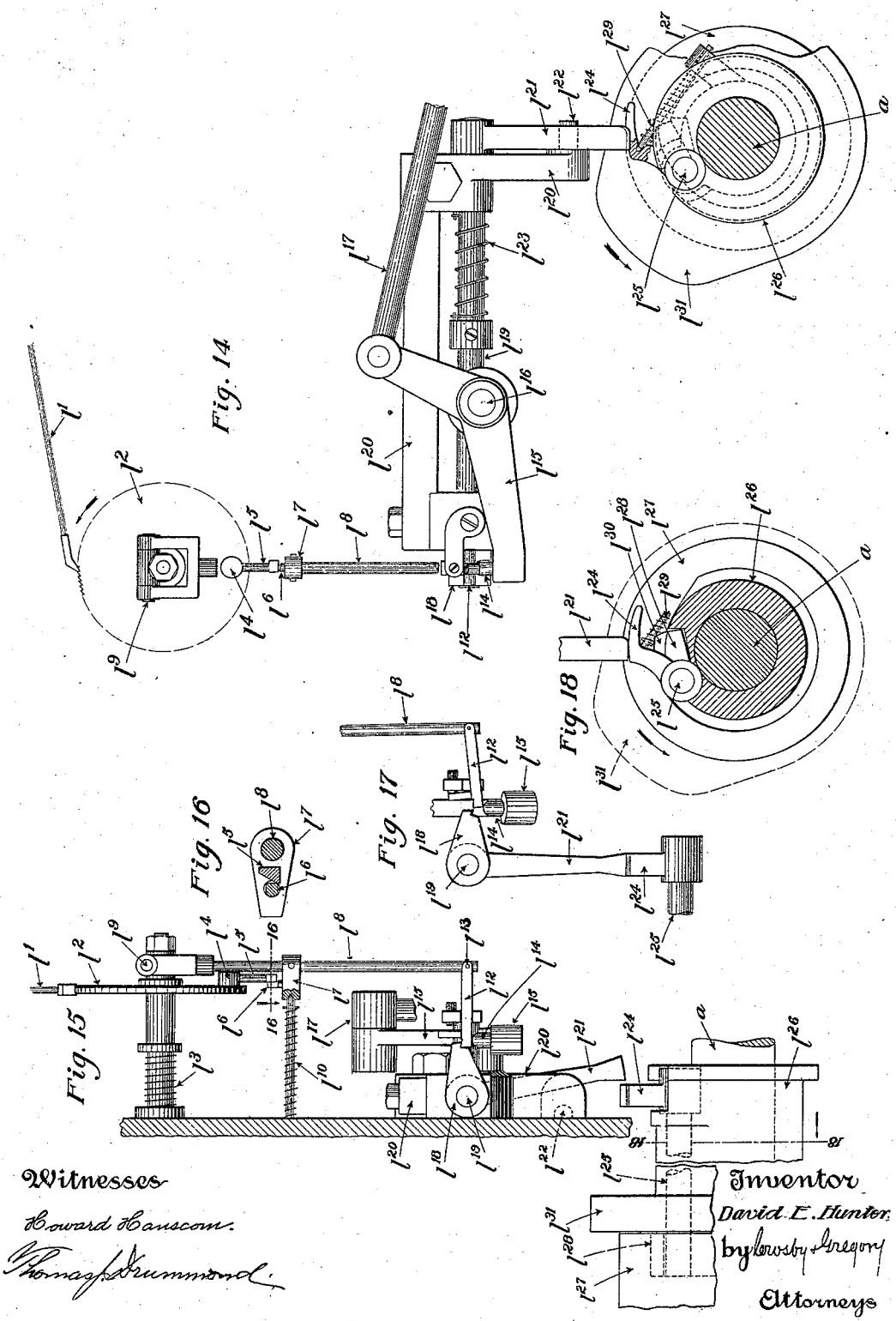
Witnesses
Howard Hanscom
Thomas F. Drummond
Inventor
David E. Hunter,
by Crosby & Gregory
Attorneys

UNITED STATES PATENT OFFICE.

DAVID E. HUNTER, OF CAMBRIDGE, MASSACHUSETTS, ASSIGNOR TO LIBRARY BUREAU, OF BOSTON, MASSACHUSETTS, A CORPORATION OF MASSACHUSETTS.

MACHINE FOR PUNCHING, RULING, AND CUTTING CARDS, &c.

SPECIFICATION forming part of Letters Patent No. 687,530, dated November 26, 1901.

Application filed July 5, 1900. Serial No. 22,536. (No model.)

*To all whom it may concern:*

Be it known that I, DAVID E. HUNTER, a citizen of the United States, and a resident of Cambridge, county of Middlesex, State of Massachusetts, have invented an Improvement in Machines for Punching, Ruling, and Cutting Cards, &c., of which the following description, in connection with the accompanying drawings, is a specification, like letters on the drawings representing like parts.

My invention is a machine for operating upon and preparing cards, paper, &c., and has for its object the provision of means for facilitating rapidity of manufacture and reducing not only the cost of manufacture, but the expense of installing and running the plant.

The introduction of the card system of indexes, records, and bookkeeping in general has gradually led to a great variety of special systems of tabulated matter, requiring an almost infinite variety of sizes of cards and kinds of rulings, it being the custom, especially in large establishments, to provide systems of cards or sheets or books especially devised and ruled for the particular business and peculiar requirements of the case in hand, and hence the business of furnishing these cards or ruled records requires a plant capable of furnishing at short notice a relatively small quantity of cards or sheets for the special requirements. Because of the rapid extension of this system of records and the peculiarities thereof, as above explained, it has been necessary to increase the number of machines and their complexity until the capital involved and the space required, hands employed, and attendent outlay have become excessive.

Accordingly my present invention aims at not only increasing the output, but providing a single machine which will do the work heretofore requiring many machines and the attention of many employees, said machine being capable of quick adjustment to receive cards or other sheet matter of any size and having other adjustments whereby it may be ruled according to any and all requirements and correspondingly punched or perforated, cut as desired, and deposited in proper arrangement for packing.

My invention also in its most complete embodiment includes counting mechanism coöperating with the cards as they pass through the machine, automatic stop-motions for detecting any default at any part of the machine in properly passing the cards through, and many other features, as will be hereinafter more particularly explained.

The details of construction shown herein in the preferred embodiment of my invention and the operation thereof will be fully set forth in the following description, reference being had to the accompanying drawings, and the invention will be more particularly defined in the appended claims.

Figure 2:
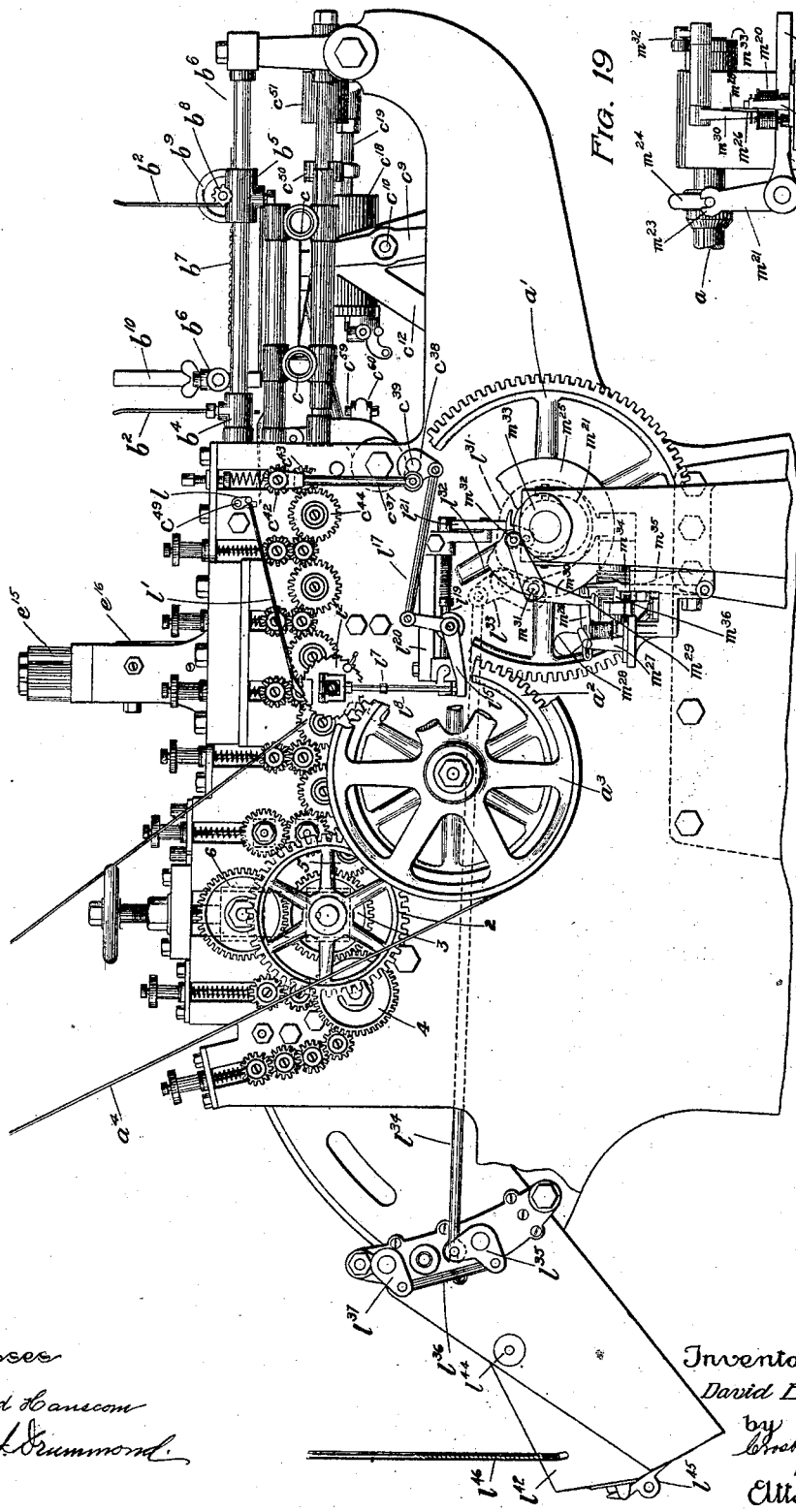

In the drawings, Figures 1 and 2 are respectively right-hand and left-hand side elevations of the machine. Fig. 3 is a top plan view thereof. Figs. 4 and 5 are longitudinal vertical sections taken on the line 4 4, Figs. 3 and 6, looking in opposite directions. Fig. 6 is a rear end elevation. Figs. 7 and 8 are vertical sections taken on the line 7, Fig. 3, looking, respectively, toward the right and toward the left. Fig. 9 is a plan, partly in section, of the mechanism shown in Fig. 8, the nipping mechanism being omitted. Fig. 10 is a broken detail, in front elevation, of the tension-rolls or yielding feed-roll. Fig. 11 is a similar view of the ruling-spindles. Fig. 12 is a transverse section thereof. Fig. 13 is an enlarged detail, in vertical cross-section, showing the shape of two of the ruling-rings. Fig. 14 is a view in enlarged side elevation, parts being broken away, showing a portion of the counting mechanism. Fig. 15 is a left-hand end view of the parts shown in Fig. 14. Fig. 16 is a sectional detail on the line 16 16, Fig. 15. Fig. 17 is a detail similar to Fig. 15 of a portion of the latter figure shown out of counting position. Fig. 18 is a sectional detail taken on the line 18 18, Fig. 15, looking toward the right. Figs. 19 to 27 are fragmentary views, in elevation and top plan, of a portion of the electric shipping or tripping mechanism shown in end elevation in Fig. 2. Fig. 20 is an enlarged cross-section, taken on the line 20 20, Fig. 4, showing one of the electric contacts. Fig. 21 is a sectional view showing in rear elevation the detector mechanism for the deflectors, the latter and adjacent parts being also shown in rear elevation. Figs. 22 and 23 show the two deflectors in side elevation, partly in section. Figs. 24 to 26 are fragmentary views of one of the detector mechanisms contained in the forward portion of the machine, said views showing the same, respectively, in top plan, front, and end elevation. Fig. 28 is a fragmentary view showing in top plan the stripping mechanism or flexors and a few adjacent parts.

The operating mechanism is mounted in any suitable frame A, which need not be described, and is driven from a power-shaft $a$, whose gear $a'$ meshes with a gear $a^2$, driven by a belt-pulley $a^3$, connected by a belt $a^4$ with any suitable counter-shaft.

The mechanism consists in general of a stationary hopper B, which contains the cards or sheets of paper or other matter which is to be ruled, cut, and otherwise manipulated and prepared, and feeding mechanism C, which includes nipping devices and feed-rolls proper, friction-rolls D, which permit of a light feeding movement, but do not feed the cards except at certain times, punching mechanism which serves to punch the cards as they are being fed, marking or ruling mechanism F, to which the cards are delivered by said friction feeding mechanism as soon as they have been punched, cutters G, separators H, which deliver the cards in series to the receiving box or magazine K, which contains a portion of the counting mechanism L and devices for delivering the cards in packages of the kind, number, and size desired, and various other details, including the detectors and stop-motion devices before mentioned, all of these mechanisms being adapted to adjustment and such changes as are necessary to accommodate them quickly to the production of all varieties of special cards or ruled matter which may be ordered to suit the particular requirements of individual consumers, as before explained.

For clearness of understanding I will now describe the detailed construction of the individual parts above enumerated, it being understood also that in this description and in the drawings I have omitted many structural details and have confined the same mainly to those constructions of invention which go to make up the novel features hereinafter claimed as constituting my invention.

Referring more particularly to Figs. 1 to 7, it will be seen that the hopper consists of a grill-like support made up of slats $b$, mounted on cross-plates $b'$, side alining fingers or standards $b^2$, carried by cross-bars $b^3$, and sleeves $b^4$ $b^5$, mounted on stationary tubes or bars $b^6$, the rear guides $b^2$ and their sleeves $b^5$ being adjustable on said bars $b^6$ by means of a rack $b^7$ and pinion $b^8$, operated by a hand-wheel $b^9$, and end guides or standards $b^{10}$, mounted at the inner ends of rods $b^{12}$, adjustable in sleeves $b^{13}$ at the ends of the hopper, the inward adjustment of the guides $b^{10}$ serving to accommodate the hopper to different lengths of sheets and the rear guides $b^2$ serving to accommodate the hopper to different widths of sheets.

My machine operates upon the principle of having the cards remain stationary in the hopper, pulling down the front edge of the bottom sheet or card by a suction device, and then moving the feeding mechanism rearwardly, the downwardly-bent front edge of said bottom sheet being meanwhile engaged by an open mouth of said feeding mechanism and swallowed thereby or shaved off, as it were, from the bottom of the stack, and when the feeding mechanism has moved back so as thus to embrace the sheet sufficiently a nipping device is caused to engage the sheet slightly back from the front edge thereof, and then the feeding mechanism moves forward with said sheet until the free front edge thereof is caught by feeding-rolls, whereupon the said nipping device instantly releases the sheet and permits the feeding-rolls to pull the same forward and deliver it to the friction feeding mechanism.

The mechanism which produces the above operations is sufficiently indicated in Figs. 2 to 7.

The ram or reciprocating part of the feeding mechanism is located beneath the hopper B and comprises a frame composed of cross-rods $c$, preferably tubular for lightness, and end rods $c'$ and an intermediate plate or rod $c^2$, which may be properly braced in any desirable fashion, and at its ends is rigidly secured at $c^3$ a plate $c^4$, provided at its middle portion with an inwardly-extending nose or separator $c^5$, which forms the upper part of the receiving-mouth, into which the card is shaved off, as indicated in Fig. 7, the lower portion of said mouth being formed by a plate $c^6$, pivotally mounted at its ends just below the plate $c^5$ and caused to operate at desired times by a crank $c^7$, pivotally connected by a link $c^8$ to a lever $c^9$, intermedially pivoted at $c^{10}$ on a bell-crank lever $c^{12}$, pivoted at $c^{13}$ on the frame of the machine and connected at its upper end to the ram for moving all the feeding mechanism thus far described, said lever $c^9$ being connected by a link $c^{14}$ to a bell-crank $c^{15}$, mounted on the lever $c^{12}$ and operated by the engagement of a cam $c^{16}$ with an arm $c^{17}$ thereof. Also carried by the ram is a cylinder $c^{18}$, which is caused by the ram to reciprocate relatively to a piston-rod $c^{19}$, fixed at its rear end to the frame of the machine and carrying a piston $c^{20}$ within the cylinder for providing the requisite vacuum for the suction apparatus, a portion of which is also mounted on and movable with the ram, being best shown in Fig. 7, where it will be seen that a tubular passage is provided in connection with the cylinder by means of a union $c^{21}$ and tube $c^{22}$, connected thereto by a tube $c^{23}$, the tube $c^{22}$ carrying at its upper end the suction device proper, $c^{24}$, which is connected to the ram-frame by a pivoted link $c^{25}$ and has intermediate its length projecting lugs $c^{26}$, adapted to be engaged by the jaw $c^{27}$ of a lever $c^{28}$, pivotally mounted on a shaft $c^{29}$ and provided with a lug $c^{30}$, whereby it is raised to the position shown in Fig. 8 at suitable times by the engagement with said lug of the lug $c^{31}$ on the lever $c^{32}$, operated by the engagement of a cam $c^{33}$ with the end of a plunger $c^{34}$, pivotally connected to said lever $c^{32}$. The right-hand end of the forward portions of the parts $c^{4}$ $c^{6}$ constitutes the receiving-mouth, which engulfs the card and permits the same to pass between said parts and has a movement sufficiently far to the front of the machine to permit the deflected end of the card to project slightly beyond its rear end, and just as the card has reached this position the part $c^{6}$ is turned on its pivot, so as to constitute, with the part $c^{4}$, a nipping device and acts to pinch the card sufficiently to feed it as the ram moves back on its return stroke. The card is then in the position shown in Fig. 7, and upon a further movement to the left, as shown in said figure, the card enters between a pair of feed-rolls $c^{35}$ $c^{36}$, which are then separated, as shown in Fig. 7, by any suitable mechanism, the upper roll $c^{35}$ being herein shown as raised by rods $c^{37}$, pivoted on cranks $c^{38}$, provided at the opposite ends of a shaft $c^{39}$, rocked at suitable intervals by a lever $c^{40}$, in engagement at its free end with a cam $c^{41}$, as best shown in Fig. 1. The nipping devices having carried the card into the position shown in Figs. 4, 5, and 8, the cam $c^{41}$ permits the rolls to come together, whereupon their gears $c^{42}$ $c^{43}$, rotated by an idler $c^{44}$, cause said rolls to positively feed the card forward. An automatic counter is operated by a trip $c^{45}$, whose arm $c^{46}$ is normally raised by the presence of a card, thereby bringing its free end $c^{47}$ into striking engagement with an arm $c^{48}$ of a rock-shaft $c^{49}$, whose connections will be presently described.

If a card is obstructed or for any reason fails to be fed between the nipping devices, the trip $c^{45}$ is permitted by the absence of a card to fall into a lowered position out of striking range with the arm $c^{48}$, and hence the machine, although going through the motions of feeding and operating on a card, does not count, for the reason that no card actually goes through.

The ram is preferably provided with a dash-pot arrangement $c^{50}$ $c^{51}$ for relieving the ram of shock at the end of its movement.

In feeding cards rapidly by suction device, as shown, there is a liability that two cards will be pulled down instead of one, and to insure that only one card at a time shall be pulled down I provide a stripper or flexor, herein shown as composed of two retarding-fingers $c^{52}$ $c^{53}$, pivoted at $c^{54}$, provided with a shoulder $c^{55}$, from which depends a plunger $c^{56}$, adapted to be engaged at its lower end by a hub $c^{57}$, mounted in an arm $c^{58}$, mounted loosely on the shaft $c^{29}$, before mentioned, and limited in its movements by a set-screw $c^{59}$ in a stationary arm $c^{60}$, projecting from a tie rod or brace $c^{61}$ and adapted to be held up at certain times by a finger $c^{62}$, pivoted at $c^{63}$ and adjustable by a set-screw $c^{64}$, said finger $c^{62}$ being held steady by a spring $c^{65}$. As the ram begins to move toward the front of the machine a projection $c^{66}$ on the under side of the lever $c^{58}$ strikes against the upper end of the finger $c^{62}$ and moves it into the position shown in Fig. 1. Meanwhile the shaft $c^{29}$ has been rocked so as to raise the suction device $c^{24}$ by the engagement therewith of the lever $c^{28}$, and as the latter raises the suction device the arm $c^{58}$ is also raised by the engagement therewith of the lug $c^{31}$.

The suction device or box $c^{24}$ is caused to act upon the bottommost card or sheet of paper, preferably just before the retarding-fingers $c^{52}$ engage and deflect said card, or the suction device and retarding-fingers may be actuated simultaneously, according to the kind of stock. The moment the suction device and stripping mechanism have been raised the finger $c^{62}$ snaps beneath the lever $c^{58}$ into sustaining position, as shown in Fig. 8, and thereby the retarding-fingers $c^{52}$ $c^{53}$ are held in raised position independently of the further movements of the mechanism which raised them. Thereupon the suction device is lowered into substantially the position shown in Fig. 7, and the continued movement of the ram causes the separator $c^{5}$ to enter the hollow or dish-shaped cavity made between the lowermost card and the next card above by the deflection produced in said lowermost card by the pulling down of its middle portion by the suction-box $c^{24}$, while the fingers $c^{52}$ $c^{53}$ at the same time hold up said card at each side of and above the suction-box. The bottommost card is maintained deflected, as described, momentarily, but yet for a sufficient time to permit the separator $c^{5}$ to get with certainty between the bottommost card and the next card, whereupon the further movement of the ram withdraws the finger $c^{62}$ from supporting engagement with the arm $c^{58}$, and thereby permits the parts to drop into the position shown in Fig. 7. At its forward end the arm $c^{58}$ is provided with a beveled end $c^{67}$, which when the arm $c^{58}$ is moved forward slides beneath a ledge $c^{68}$ on a stem $c^{69}$, normally held down by a spring $c^{70}$, said stem at its inner end passing through a gland $c^{71}$ of the vacuum-cylinder and having a valve $c^{72}$ on its extreme inner end, which serves to open and close the port $c^{73}$, which controls the action of the suction apparatus, so that by this means the suction-box $c^{24}$ is brought into active operation at the moment that it has reached the position shown in Fig. 8 and when the stripper is in proper relation with the cards.

The suction apparatus is positively and quickly lowered by a spring $c^{74}$, and the stripper is also given a quick action by a spring $c^{75}$.

Different kinds and weights of paper require different manipulation, and accordingly I have mounted the hub $c^{57}$ eccentrically, as indicated in Fig. 8, being retained in position by a set-screw $c^{76}$, whereby the amount of retarding action or separating, bending, or deflecting of the bottom card or sheet of paper may be varied to suit the special requirements. The adjustment at $c^{59}$ is provided to prevent undue lost motion of parts and enable the machine to act more promptly in operating the valve $c^{72}$. The card having been fed along, as stated, is received by a flared open end $d$ of opposite guides $d'$, which are arranged at intervals parallel to each other throughout the width of the machine, the card being received between tension-rolls or friction-feeds $d^2$ $d^3$, arranged in opposite pairs, there being herein shown two pairs thereof in front of the punching mechanism E and two pairs at the rear thereof, said rolls being shown in detail in Fig. 10, where it will be seen that the roll $d^2$ has two ribs and roll $d^3$ a single rib arranged in groups normally traveling in a plane slightly lower than the peripheral plane of the two ribs, whereby the card or sheet of paper is bent, as shown in Fig. 10, the bend, however, being extremely slight, so as not to change the direction of feed of the paper or interfere with its proper smooth plane condition and yet sufficient to give a frictional pulling hold of the rolls on the paper sufficient to enable them to feed the paper forward. One object of this mechanism is to permit the tension or feeding rolls $d^2$ $d^3$ to have continuous movement without interfering with the stoppage of the card or paper for the purpose of being punched.

The stopping mechanism is herein shown in the form of a gate $e$, having a rib $e'$, against which the front edge of the paper or card abuts at the moment when it is necessary that it should be stopped in order to be punched, it being understood that the moment the card comes against the gate its further progress is immediately stopped and then it is punched, whereupon the gate moves out of engagement therewith and the further feeding of the card takes place, all this occurring without any halt being required of the moving parts, thereby making it possible not only to save power, but to materially increase the rapidity of operation. The gate $e$ is pivoted at $e^2$ (see Fig. 4) on cranks $e^3$ of a shaft $e^4$ and is raised and lowered at suitable times by a rod $e^5$, pivoted at $e^6$ to a lever $e^7$, whose free end $e^8$ is actuated by a cam $e^9$. In order that the gate $e$ may be kept level, I have secured the same to the upper end of a bar $e^{10}$, pivoted at $e^{11}$ to a link $e^{12}$, pivoted at $e^{13}$ at substantially the same angle to the pivotal center of the lever $e^7$ as the pivot $e^2$ bears to the center of the shaft $e^4$.

As herein shown, the perforating apparatus is mounted at about the middle of the machine in a frame $e^{15}$, having slideways at its ends which support and guide a punch-carrier $e^{16}$, having a plurality of gangs of punches.

As already explained, the present machine has for one of its objects the provision of means for the accommodation of various widths, lengths, and, in fact, practically all kinds of card and ruling work which the requirements of a large factory demand, and I have already explained the manner in which my machine is adaptable for feeding all these various kinds, &c., of cards. The same requirements demand that the punch shall be adjustable; but inasmuch as a punching mechanism must be extremely rigid and solid in order to act with absolute accuracy in rapid work, on perhaps very thick paper or cardboard, I have found it preferable to provide instead of a gang of adjustable punches a series of gangs of rigid punches, said plurality of punches being spaced along the punch carrier or bar at intervals corresponding to the standard measurements of cards proceeding on the principle of tenths, as is clearly evident viewing Fig. 3, and each punch $e^{17}$ is capable of being withdrawn from active operation, being normally held down by a pin $e^{18}$, against the upper end of which bears a set-screw $e^{19}$, said parts being preferably carried in a removable punch-holder $e^{20}$, the punch also being preferably further held in place by a side set-screw $e^{21}$. The punch is surrounded by a small stripper $e^{22}$, slidingly supported on pins $e^{23}$, depending from the punch-holder, said strippers being normally held downward by springs $e^{24}$. Below the punch is a die or proper cavity formed in a die-box $e^{25}$, the chips or punchings falling through a hole $e^{26}$. The punch-carrier and punches are simultaneously operated by rods $e^{27}$, secured at their upper ends to the punch-carrier, and at their lower ends operated by cranks $e^{28}$, fast on a shaft $e^{29}$ and actuated by a face-cam $e^{30}$ and lever $e^{31}$.

As already explained, this machine is intended to accommodate all kinds and sizes of paper or cards which the usual manufacture demands, and accordingly, in order to accommodate different lengths of cards, I have mounted the ledge $e'$ of the gate $e$ adjustably on the lower part of the gate, said ledge or ledge-support being provided with a depending ear, which is engaged by an adjusting-bolt $e^{32}$, whereby the ledge $e'$ may be shifted nearer to or farther from the punch, according to the requirements of the case.

It will be understood that the cards merely hesitate, as it were, or stop a small fraction of a second for the punching, and the moment that they have been punched the gate $e$ drops out of engagement with the cards, the latter being prevented from following the movement of the gate by the guides $d'$, and the card then immediately continues its feeding movement by the frictional engagement therewith of the tension-feed and passes on to the ruling mechanism, there being herein shown a principal ruling-spindle $f$ and a coöperating lower spindle $f'$, each provided with coöperating rings $f^2 f^3$ and held yieldingly toward each other by a spring $f^4$, an inking-roll $f^5$ and pan $f^6$ being provided in convenient proximity thereto.

As the paper or cardboard passes beyond the ruling-spindles it is caught by a combined feeding and cutting mechanism, shown as comprising upper and lower rolls $g\ g'$, being each provided with middle cutting-rings $g^2 g^3$ and feed-rings or tension-collars $g^4$, preferably composed of rubber, the rings $g^2$ being fast on the shaft or roll $g$, and the rings $g^3$, mounted loosely on the shaft $g'$, being simply held against rotation thereon by a spline $g^5$ and pushed constantly into close shearing pressure against the cutter $g^2$ by a pressure-block $g^6$, preferably of fiber, carried by an arm $g^7$. (Shown in plan in Fig. 3 and in elevation in Fig. 4.) The result of the above construction is that as the paper or cardboard is engaged by the cutting mechanism the rubber disks or rings thereon seize the same at a plurality of points simultaneously and make it impossible that the paper should be thrown sidewise or slued to one side or the other.

One of the most common and serious faults heretofore experienced in attempting to make a large number of cuts simultaneously across a sheet of paper has been that each cutter would tend to turn or deflect the paper very slightly from a rectilinear path, and the aggregate effect of the series of cutters would be that the edges of the strips instead of being perfectly straight and accurate would be more or less curved. This defect has heretofore rendered it impracticable to perform the operation which it is the purpose of this machine to perform—viz., to operate on a large number of places on the paper at once—and I therefore regard this feature of my invention as of considerable importance. By having the rubber disks spaced apart, as shown and described, the twisting or sluing tendency of the cutters is counteracted or prevented, and the paper is maintained perfectly true, while at the same time the maintaining of the cutters fast in accurate shearing alinement and engagement reduces the sluing tendency to a minimum. As the paper is cut into separate sheets or cards the latter are received between the feed-rolls $h\ h'$, the latter roller being preferably covered with rubber. As the cards are fed by the rollers $h\ h'$ they are engaged by deflectors $h^2 h^3$, mounted on a transverse rod $h^4$, by means of which the adjacent cards or streams of cards, as it were, are guided downwardly and upwardly, respectively, the former stream of cards being received between feed-rolls $h^5 h^6$ and the upper stream of cards being received between rolls $h^7 h^8$, being also preferably guided between the respective sets of guides $h^9 h^{10}$. In order that the deflectors may correspond accurately with the various widths of cards which are being run through the machine at any time, I mount the deflectors $h^2 h^3$ slidingly on a fixed rod $h^{12}$, provided with a spline $h^{13}$, along which the said deflectors may slide, the latter having arms $h^{14}$ partially embracing said rod with an open space, by which they may be placed on or removed from said rod by being slid to one end thereof, where I have flattened the same for the purpose, as indicated at $h^{15}$. Opposite the arms $h^{14}$ I provide said deflectors with spring-pressed friction devices $h^{16}$, which engage the rod $h^{12}$ and retain the deflectors from accidental shifting movement along the same. The cards passing between the lower set of feed-rolls are received in a magazine $k$ and the cards passing between the upper set of rolls are received by a magazine $k'$. This deflecting or separating of adjacent sets of cards is also an extremely important matter in this machine, as it is obvious that in order to make practical the manipulation and completion of a large number of cards side by side, fed into the machine in the form of long sheets of paper to be delivered from the machine in the form of finished cards, and at the same time have said cards cut, punched, ruled, &c., with absolute accuracy to the same extent as would be accomplished by the most accurate hand-machine operating on a single card, it is necessary for the best results that the paper or cardboard should remain even after it is cut without lateral disturbance, and yet the cards must be kept separate and without confusion, such as would inevitably result if the cards as they were delivered from the cutters should simply be dropped into a hopper or magazine. Accordingly, inasmuch as the cards pass through the rolls $h\ h'$ in practical contact edge to edge with each other and would therefore drop into a promiscuous heap, I have succeeded in solving the difficulty by simply raising every alternate stream of cards as it pours through the rolls $h\ h'$, so that one stream goes into an upper hopper or magazine and the next stream goes into the lower hopper or magazine, the result being that the upper magazine contains, for instance, as herein shown, four heaps of cards separated from each other by intervening spaces equal to the width of the card, and the lower magazine contains five heaps of cards similarly separated.

Viewing Fig. 2, it will be seen that the gear $a^2$ drives a gear 2, on whose shaft is mounted a pinion 3, which is in mesh with other pinions 4, 5, and 6, and from these latter the entire train of mechanism thus far described is driven by pinions and intermediate gears.

Referring now to the mechanism brought into action by the trip $c^{45}$, before mentioned, which is, as already described, raised by the presence of a card between the nippers into alinement with the arm $c^{48}$, so as to strike the latter when the ram moves back and thereby rock the rock-shaft $c^{49}$, it will be seen, referring to Figs. 2 and 14 to 18, that said rock-shaft has at one end a crank $l$, which carries a click-pawl $l'$ in engagement at its free end with a ratchet-wheel $l^2$. The ratchet-wheel is provided with teeth corresponding in number to the cards which are to compose a package, being provided with a retarding device, shown in the form of a spring $l^3$, to prevent its accidental overcarrying, and having a finger $l^4$ provided at its free end with a wedge-shaped engaging portion $l^5$, Fig. 16, adapted to engage once in every cycle with a roll $l^6$, projecting from a stirrup $l^7$, mounted on a rod $l^8$, pivoted at $l^9$ loosely on the ratchet or counter-shaft and normally held outwardly by a spring $l^{10}$, carrying at its lower end a latch $l^{12}$, pivoted thereon at $l^{13}$ and resting with its free end on the projecting end $l^{14}$ of the bell-crank lever $l^{15}$, pivoted at $l^{16}$ to the frame of the machine and connected by a link $l^{17}$ to the adjacent crank $c^{38}$ of the shaft $c^{39}$, already described. It will be recalled that the shaft $c^{39}$ is rocked every time the ram is reciprocated, this rocking having already been described as causing the primary feed-rolls $c^{35}$ $c^{56}$ to separate for the reception of a card. This same rocking movement causes the bell-crank $l^{15}$ to swing up and down, thereby similarly moving the latch $l^{12}$. This latch when the rod $l^8$ is in its outermost position, as shown in Fig. 17, is free of engagement with a lever $l^{18}$ on the forward end of a shaft $l^{19}$, journaled in a bracket $l^{20}$, carried by the frame of the machine. The shaft $l^{19}$ at its forward end carries a dog $l^{21}$, normally held against a stop $l^{22}$ by a spring $l^{23}$, in which position it engages a trip $l^{24}$, pivoted at $l^{25}$ in one member $l^{26}$ of a clutch, the other member of which is shown at $l^{27}$, the two being normally disconnected, as shown in Fig. 18, but being connected by the engagement of a pawl $l^{28}$, operated by the trip $l^{24}$ to either occupy a recess in the part $l^{26}$, as shown in said Fig. 18, or to be moved by a spring $l^{29}$ into a recess $l^{30}$ in the outer portion of $l^{27}$ of the clutch, whereupon the two are locked together, and the rotary motion of the latter $l^{27}$ is communicated thereby to the part $l^{26}$ which carries a cam $l^{31}$. This cam bears on a roll $l^{32}$ of a lever $l^{33}$, pivoted on the frame of the machine, and having connected at its free end a rod $l^{34}$, which serves to operate at its opposite end a bell-crank lever $l^{35}$, connected by a link $l^{36}$ to a crank $l^{37}$ of the magazine, said crank and bell-crank serving to operate shafts $l^{38}$ $l^{39}$, respectively, from which depend gates $l^{40}$ $l^{41}$ of the respective magazines. Below said gates are extensions or receiving-chambers $l^{42}$ $l^{43}$, into which the cards contained in the magazines $k'$ $k$ may slide when the gates are open. The cards rest by gravity against the gates, which, it will be understood, may, if desired, themselves constitute the bottoms of the magazines or be otherwise arranged, as convenience or preference may dictate, the idea being to have the cards retained in the magazine or magazines until the proper number have accumulated, whereupon they are automatically discharged by the tripping of the restraining devices or gates. The upper chamber has its lower portion pivoted at $l^{44}$ and normally maintained in locked position by a latch $l^{45}$, engaging the upper portion of the lower chamber $l^{43}$, to be lifted when desired by a cord or pulley $l^{46}$, so as to give access to the lower chamber for the removal of cards.

From the above description it will be seen that each card as it passes through the machine is counted and that when the predetermined number—for instance, one hundred—of cards have been deposited in each magazine across the machine, both in the upper and in the lower tier, the gates will be automatically opened and each group or package of one hundred cards will be automatically deposited in the lower chambers, whereupon the gates will be closed until another complement of cards has been deposited in the magazines, whereupon the operation is automatically repeated.

As already stated, my main endeavor in inventing this machine has been to provide mechanism which operates on sheets of paper or cardboard, so as to turn out a finished product with absolute accuracy as to finish and as to numbers or packages of cards and perform all its operations automatically with extreme rapidity, so as to minimize time, labor, power, and space, and thereby provide a margin of profit which will withstand competition, and in order to make this possible it is necessary that the machine should not be liable to mutilate a series of cards or run defectively. Accordingly I have provided at the important points in the machine automatic arresters or stop-motions, whereby any defect will be detected and the machine will be stopped before any more cards have been spoiled, said mechanism being shown best in Fig. 4, being herein shown as electrically connected, although it will be understood that any equivalent construction may be employed. At any suitable place I provide a battery or other source of energy $m$, (see Figs. 4 and 21,) from which I take connections $m'$ $m^2$ to make-and-break contacts $m^3$ $m^4$, preferably normally separated and brought into contact by the rocking of a bar $m^5$, provided with a finger $m^6$, adapted to be depressed by the spring or contact $m^3$ and operated by a detector $m^7$. The latter hangs just over the path of the upwardly-deflected cards as they pass into the upper magazine, and if a card should get jammed against the same it would raise the detector sufficiently to close the circuit. At the front or entrance end of the machine I also provide contacts $m^8$ $m^9$, (see Figs. 5, 24, 25, and 26,) the latter being in the form of a spring normally out of contact with $m^8$, but capable of being brought into contact therewith by an insulated member $m^{10}$, resting behind it and projecting up from a U-shaped detector $m^{12}$, whose feet $m^{13}$ depend on the opposite sides of the adjacent guide $d'$, so that every time a card passes through the detector $m^{12}$ will be raised and make the contact at $m^9$ $m^8$, which contacts are connected by wires $m^{14}$ $m^{15}$ with a main wire and branch connection. As many of these detectors may be provided as desired, there being another set herein shown at $m^{16}$.

In connection with a suitable part of the driving mechanism of the machine I provide a controlling set of contacts, one of them being herein shown as provided at $m^{17}$ on the end of a finger $m^{18}$, projecting from the shaft $c^{39}$, the other contact $m^{19}$ being stationary on the machine. The wiring and arrangement are such that when the shaft $c^{39}$ rocks to raise the primary feed-rollers in order to receive a fresh series of cards to be fed into the machine the controlling-contacts are brought into position to close the circuit, and if at this instant a card is still engaged by the next set of feed-rollers, which properly should not be the case, the contacts at one side or the other of said feed-rollers will also be closed, thereby completing the circuit and stopping the machine, as will be presently explained. So, likewise, if when the primary feed-rollers are separated to receive a new feed of cards any irregularity has occurred at the deflectors or at the outgoing end of the machine the circuit will be completed and the machine stopped.

Any suitable tripping clutch mechanism may be provided for stopping the feeding of the machine upon closing or bringing into action the electrical circuit or equivalent device, there being herein shown, viewing Figs. 2, 6, 19, and 27, a preferred form comprising a solenoid $m^{20}$, which operates a tripping mechanism for a lever $m^{21}$, heavily weighted at its end $m^{22}$ and bifurcated at $m^{23}$, where it engages and shifts a shipper-block $m^{24}$, to which is connected any usual kind of friction or other clutch $m^{25}$. The tripping mechanism is shown as comprising an armature $m^{26}$, slidingly pivoted at the top of a post $m^{27}$, adjacent the solenoid, and normally held in raised and retracted position by a spring $m^{28}$; but when attracted by the solenoid the inwardly-projecting free end of said armature is lowered opposite the end $m^{29}$ of a swinging lever $m^{30}$, pivoted at $m^{31}$, and engaged at its opposite end $m^{32}$ by an oval cam $m^{33}$. The upward movement of the lever $m^{29}$ then engages the end of the armature, and thereby pushes forward a latch $m^{34}$ against its spring $m^{35}$ and out of supporting engagement with a lug $m^{36}$ on one side of the weighted end $m^{22}$, permitting the latter to drop and disconnect, by means of the clutch, the cam-shaft $a$ from its driving-gear $a'$, so that no more fresh cards will be fed into the machine; but preferably the other parts of the machine will continue to operate so as to free the machine of the obstructing or disarranged cards which have caused the trouble.

I have already described to quite an extent the operation of my machine, and it will therefore be sufficient to summarize it as follows: The sheets of paper or cardboard are stacked evenly in the hopper, being held in place by the side and end standards, which have been accurately adjusted toward or from each other as required to accommodate the precise size of sheets which are to be operated upon. The ram is then moved forward toward the front end of the machine, and in doing so the suction device raises into approximate contact with the bottom sheet at the rear edge thereof and quickly sucks downwardly on the same, whereupon the strippers or flexors bend the card, thereby stripping therefrom the sheet above the same and providing an opening properly shaped and disposed to receive the separator, whose nose enters between the bottommost sheet and those next above it and permits the said bottommost sheet to be shaved off and to enter between the nippers in the position shown in Fig. 7, whereupon, the suction-valve and strippers having previously been rendered inoperative, the sheet is carried forward by the nippers and enters between the raised primary feed-rolls, and the counter mechanism is thereby simultaneously moved forward one notch. The sheet then passes between the tension feed or friction rolls until it gets in exactly proper position beneath the punching apparatus, whereupon it is suddenly stopped by the raising of the gate $e$ and the gang of punches descends instantly, and thereupon, the card having been punched and the punches having been raised, the gate moves out of the way and the sheet continues to feed along, coming next to the ruling mechanism, in which it is properly ruled, and thence passes to the cutting mechanism and from thence, without any chance of sluing or twisting, it passes directly to the deflectors and is deposited in separate piles in the magazines, which retain the successive cards until the correct number thereof are received, whereupon they are discharged and thereafter collected.

I am aware that cutting mechanism and ruling mechanism and punching mechanism and card-feeding mechanism have all been provided heretofore in individual machines, and I do not therefore intend herein to limit myself to the specific details of these separate mechanisms, as my object herein has not been so much to invent specific mechanisms for these individual operations as it has been to invent a single unitary machine which would accomplish automatically without any manual handling of the cards or sheets all the operations which heretofore have required a number of machines, and therefore a large floor-space, corresponding amount of shafting and counter-shafting, attendants, and increased expenses. I therefore repeat that it has been the main object of my present invention to provide a single mechanism in which large sheets of paper or cardboard might be placed to be turned out finally in the form of completely-finished cards, ruled, punched, and cut with absolute precision.

In my claims hereinafter I have claimed certain subcombinations as well as the main combination or complete machine, and it will accordingly be understood that various portions of the machine may be omitted to good purpose for securing certain objects, but that for complete results the machine will be used as already described, it being understood that many changes and substitutions may be resorted to within the spirit and scope of my invention.

Certain features of my invention as herein shown are new in themselves—as, for instance, the ruling-spindles and the friction or tension feed-rolls—and I have claimed the same in other applications filed concurrently herewith.

Having described my invention, what I claim, and desire to secure by Letters Patent, is—

1. In a machine of the kind described, means for receiving and retaining a stack of sheets, positive feeding mechanism for receiving and feeding said sheets in succession, intermittingly-acting feeding mechanism arranged to receive the sheets from said positive feed, punching mechanism arranged to punch the sheets in the intervals between the feeding thereof by said intermittent feed, ruling mechanism, said intermittent feed feeding the sheets to said ruling mechanism, cutters and feeders adjacent said ruling mechanism receiving the sheets from the latter, cutting them transversely and feeding them onward, and mechanism for maintaining the individual streams of cards separate and preventing them from becoming mixed together.

2. In a machine of the kind described, means for receiving and retaining a stack of sheets, positive feeding mechanism for receiving and feeding said sheets in succession, intermittently-acting feeding mechanism arranged to receive the sheets from said positive feed, operating mechanism for operating upon the said sheets in the intervals between the feeding thereof by said intermittent feed, a second operating mechanism for operating upon the sheets, said intermittent feed feeding the sheets to said second operating mechanism, cutters and feeders adjacent said second operating mechanism receiving the sheets from the latter, cutting them transversely and feeding them onward, separating mechanism for separating the individual streams of cards as they are cut, and means for adjusting all the aforesaid mechanism as far as necessary to accommodate it accurately to various sizes of sheets which it is desired to operate upon and which the machine is required to manipulate.

3. In a machine of the kind described, a hopper for holding a stack of sheets and delivering the same, one by one, feeding mechanism for feeding the sheets, and operating mechanism for operating upon the sheets, said feeding mechanism including a suction apparatus and a stripping apparatus, said stripping apparatus having a finger extending at one side of the suction apparatus, and means for moving said suction apparatus and stripping apparatus into engagement with the bottom sheet, the stripping apparatus flexing said sheet when the latter is held downward by said suction apparatus, and a separator for entering between said flexed and superimposed sheets and separating the bottom sheet.

4. In a machine of the kind described, a hopper for holding a stack of sheets and delivering the same, one by one, feeding mechanism for feeding the sheets, and operating mechanism for operating upon the sheets, said feeding mechanism including a suction apparatus and a stripping apparatus, said stripping apparatus having a finger extending at one side of the suction apparatus, and means for moving said suction apparatus and stripping apparatus into engagement with the bottom sheet, the stripping apparatus flexing said sheet when the latter is held downward by said suction apparatus, a separator for entering between said flexed and superimposed sheets and separating the bottom sheet, and nippers for engaging said separated sheet back from the feeding end thereof and carrying the same to other feeding mechanisms.

5. In a machine of the kind described, a hopper for holding a stack of sheets and delivering the same, one by one, feeding mechanism for feeding the sheets, and operating mechanism for operating upon the sheets, said feeding mechanism including a suction apparatus and a stripping apparatus, said stripping apparatus having a finger extending at one side of the suction apparatus, and means for moving said suction apparatus and stripping apparatus into engagement with the bottom sheet, the stripping apparatus flexing said sheet when the latter is held downward by said suction apparatus, a separator for entering between said flexed and superimposed sheets and separating the bottom sheet, and means operated by the actuator of said stripper for bringing into action said suction apparatus.

6. In a machine of the kind described, a hopper for receiving a stack of sheets, and means for flexing the feeding edge of the bottom-most sheet, whereby a pocket or cavity is formed between said sheet and the superimposed sheets, and means coöperating with said flexing mechanism for entering into said pocket-like space and separating the bottom-most sheet from the remaining sheets, means for carrying said separated sheet forward, and other feeding mechanism for receiving said sheet and feeding it forward in the machine.

7. In a machine of the kind described, a hopper for receiving a stack of sheets, and feeding mechanism for feeding said sheets successively, said feeding mechanism including a mouth or passage through which the sheets pass in being fed, a trip normally in the path of the sheets in said mouth, counting mechanism having a movable portion or actuating device normally out of the path of said trip, said trip being moved into the path of said actuator by the presence of a sheet, and means for moving said trip into engagement with said actuator in the feeding operation of the machine.

8. In a machine of the kind described, a hopper to receive a stack of sheets, a reciprocable ram beneath said hopper, a suction device carried by said ram and movable relatively thereto, a lifter for raising said suction device into operative position, said lifter being stationary relatively to said ram and having a jaw or engaging surface opening toward said ram to receive said suction apparatus, means for raising said lifter and thereby raising said suction device, said suction device being moved out of connection with said lifter by the movement of said ram, and means for receiving the sheet pulled down by said suction device and feeding it in the machine.

9. In a machine of the kind described, a hopper to support a stack of sheets, means for pulling down the feeding edge of the bottommost sheet, a stripper for flexing said edge of said sheet and thereby separating it from the superposed sheets, said stripper resting beneath said sheet and having a retarding-finger for pressing against the sheet at one side of said pulling-down means, means for raising said finger, and a device for adjusting said raising means according to the requirements of different grades of stock.

10. In a machine of the kind described, a hopper to support a stack of sheets, means for pulling down the feeding edge of the bottommost sheet, a stripper for flexing said edge of said sheet and thereby separating it from the superposed sheets, said stripper resting beneath said sheet and having a retarding-finger for pressing against the sheet at one side of said pulling-down means, and a lever for raising said finger, said lever having an eccentric hub adjustably mounted therein for lifting said finger.

11. In a machine of the kind described, a hopper to support a stack of sheets, means for pulling down the feeding edge of the bottommost sheet, a stripper for flexing said edge of said sheet and thereby separating it from the superposed sheets, said stripper resting beneath said sheet and having a retarding-finger for pressing against the sheet at one side of said pulling-down means, a lever for raising said finger, said lever having an eccentric hub adjustably mounted therein for lifting said finger, and means for regulating the amplitude of movement of said lever.

12. In a machine of the kind described, a hopper to support a stack of sheets, a suction apparatus for pulling down the feeding end of the bottommost sheet, a stripper for flexing the feeding end of said sheet adjacent said suction device, means for raising said stripper to flexing position, means operated by the movement of said suction device for actuating said stripper, and a sustaining device for maintaining said stripper in operative position after the raising means thereof has become inoperative.

13. In a machine of the kind described, a hopper having opposite sides of extreme length, means for adjusting the width of said hopper, and a rack-and-pinion mechanism adjacent the ends of said sides for adjusting the latter, said mechanism being operated by a single shaft for maintaining said sides in parallelism as they are adjusted.

14. In a machine of the kind described, a hopper to receive a stack of sheets, feeding mechanism including a mouth or passage through which the sheets pass, the opposite sides of said passage being movable toward and from each other to constitute a nipping device for nipping the sheet and carrying the same, positive feed-rolls, and means for separating said feed-rolls, said nipping device carrying said sheet to said separated rolls, and means permitting the latter to close upon said sheets and feed the same forward.

15. In a machine of the kind described, a hopper to support sheets to be fed, feeding mechanism therefor, positive feed-rolls to receive said sheets, rigid guides having flaring mouths between which said positive feed-rolls deliver the sheets, tension-rolls for feeding said sheets with a yielding friction, punching apparatus for punching the sheets, a gate or stopping means for engaging and holding a sheet stationary against the feeding tendency of said tension-rolls while the sheet is being punched, and means for operating the punching mechanism.

16. In a machine of the kind described, a hopper or receptacle for holding sheets to be fed, feeding mechanism, tension-rolls for feeding said sheets with a yielding friction, punching mechanism, and means for stopping the sheets while being punched and permitting them to continue immediately upon being punched.

17. In a machine of the kind described, means for supplying sheets in succession, a feeding mechanism to receive said sheets, a punching mechanism to punch said sheets, and a gate movable into the path of said sheets to stop the same for punching.

18. In a machine of the kind described, means for supplying sheets in succession, a feeding mechanism to receive said sheets, a punching mechanism to punch said sheets, and a gate movable into the path of said sheets to stop the same for punching, said gate being adjustable toward and from said punching mechanism to regulate the positions of the holes in the sheets.

19. In a machine of the kind described, means for supplying sheets in succession, a feeding mechanism to receive said sheets, a punching mechanism to punch said sheets, said punching mechanism comprising a punch-carrier movable up and down, a plurality of gangs of punches carried thereby, said punches being spaced apart to correspond to the standard measurements of cards, and means for independently retracting the punches to inoperative position, whereby any gang of punches may be used and the others rendered inoperative.

20. In a machine of the kind described, means for supplying sheets in succession, a feeding mechanism to receive said sheets, punching mechanism and ruling mechanism for respectively punching and ruling the sheets as thus fed by said feeding mechanism, and means for adjusting said mechanisms to accommodate various sizes of work.

21. In a machine of the kind described, means for supplying sheets in succession, a feeding mechanism to receive said sheets, punching mechanism and cutting mechanism for respectively punching and cutting the sheets as thus fed by said feeding mechanism, and means for receiving the contiguous cards or cut portions of the sheets and deflecting them in alternate streams or series into separate magazines, and said magazines.

22. In a machine of the kind described, means for supplying sheets in succession, a feeding mechanism to receive said sheets, and combined feeding and cutting rolls consisting of alternate disk cutters and feed-rings spaced apart according to the requirements of the widths of cards being cut, the feed-rings serving to contact with and feed the cards or strips while the sheet is being severed by the cutters, and deflectors for engaging the alternate series of strips and deflecting into separate paths.

23. In a machine of the kind described, combined feed rolls and cutters arranged opposite each other and each comprising a series of disk cutters overlapping at their edges, and feed-rings or tension-collars, said feed-rings having a friction-surface, such as rubber or other suitable material, and being opposite each other to receive and retain the sheet between them and both feed it and keep it from sluing while being cut by the overlapping disk cutters.

24. In a machine of the kind described, feeding mechanism for feeding sheets in succession, cutting mechanism for cutting said sheets into contiguous strips, and deflectors arranged angularly to each other for deflecting alternate strips into opposite paths, whereby the strips as they are deposited fall separated from each other by intervening spaces.

25. In a machine of the kind described, feeding mechanism for feeding sheets in succession, cutting mechanism for cutting said sheets into contiguous strips, upper and lower magazines or receptacles at different levels for receiving the strips thus cut, and deflectors adjacent said cutters for deflecting alternate strips into the upper magazine, and the remaining strips into the lower magazine.

26. In a machine of the kind described, feeding mechanism for feeding sheets in succession, cutting mechanism for cutting said sheets into contiguous strips, upper and lower magazines or receptacles for receiving the strips thus cut, and deflectors adjacent said cutters for deflecting alternate strips into the upper magazine, and the remaining strips into the lower magazine, said deflectors and cutters being adjustable transversely of the machine to accommodate different widths of strips or cards.

27. In a machine of the kind described, feeding mechanism for feeding sheets in succession, cutting mechanism for cutting said sheets into contiguous strips, upper and lower magazines or receptacles for receiving the strips thus cut, and deflectors adjacent said cutters for deflecting alternate strips into the upper magazine, and the remaining strips into the lower magazine, said deflectors consisting of independent fingers extending in the different required directions and having rear portions mounted on and partially embracing a transverse rod and movable longitudinally of said rod, being interlocked thereon against rotary movement.

28. In a machine of the kind described, feeding mechanism for feeding sheets in succession, cutting mechanism for cutting said sheets into contiguous strips, upper and lower magazines or receptacles for receiving the strips thus cut, and deflectors adjacent said cutters for deflecting alternate strips into the upper magazine, and the remaining strips into the lower magazine, said deflectors consisting of independent fingers extending in the different required directions and having rear portions mounted on and partially embracing a transverse rod and movable longitudinally of said rod and interlocked thereon against rotary movement, each deflector having a friction device for retarding its said longitudinal movement.

29. In a machine of the kind described, feeding mechanism for feeding sheets or cards in succession, operating mechanism to operate on said sheets or cards, counter apparatus actuated by the passage of successive sheets or cards, a magazine for receiving the cards from the machine, and a gate against which said cards rest in said magazine by gravity, and clutch mechanism connected to operate said gate, said clutch mechanism being controlled by said counter apparatus, whereby when the latter has been actuated by the passage of a predetermined number of cards it automatically permits said clutch to operate and thereby discharge the cards from said magazine.

30. In a machine of the kind described, feeding mechanism for feeding sheets or cards in succession, operating mechanism to operate on said sheets or cards, counter apparatus actuated by the passage of successive sheets or cards, a magazine for receiving the cards from the machine, and a gate for retaining the cards in said magazine, said counter mechanism including a trip in the path of the cards, a device actuated by said trip when a card passes, and left inoperative when no card is passing, a wheel operated thereby, a clutch comprising an idle part and a movable part continuously moving during the movement of said feeding mechanism, means carried by said wheel for locking said two parts of the clutch together at predetermined intervals, and connections between said gate and said normally idle part of said clutch for operating the gate by the movement of the latter.

31. In a machine of the kind described, feeding mechanism for feeding sheets or cards in succession, operating mechanism to operate on said sheets or cards, counter apparatus actuated by the passage of successive sheets or cards, a magazine for receiving the cards from the machine, and a gate for retaining the cards in said magazine, said counter mechanism including a clutch, part of which is connected to operate said gate and is normally idle, and the other part of which is normally in motion, means for connecting said idle and moving parts of the clutch, said means including a dog, a latch normally out of the path of said dog and connected to a movable part of the machine, to be moved in synchronism with the passage of the cards, a counter actuated by the passage of the cards, and means operated by said counter at predetermined intervals for shifting said latch into the path of said dog, whereby said clutch is caused to operate said gate to discharge predetermined numbers of cards.

32. In a machine of the kind described, means for supplying sheets or cards in succession to be operated upon, feeding mechanism for feeding said cards, operating mechanism to operate upon said cards successively, discharge mechanism for discharging said cards when finished, and detectors for preventing the feeding into the machine of more cards upon the stoppage or improper action of cards already going through the machine, said detectors being located in said feeding mechanism between the entrance of the cards thereto and said operating mechanism, and mechanism connected with and operated by said detectors for automatically stopping the delivery of any more cards to said feeding mechanism.

33. In a machine of the kind described, means for supplying sheets or cards in succession to be operated upon, feeding mechanism for feeding said cards, operating mechanism to operate upon said cards successively, discharge mechanism for discharging said cards when finished, and detectors for preventing the feeding into the machine of more cards upon the stoppage or improper action of cards already going through the machine, said detectors being located in said feeding mechanism between the entrance of the cards thereto and said operating mechanism, mechanism connected with and operated by said detectors for automatically stopping the delivery of any more cards to said feeding mechanism, and other detectors similarly operating said automatic stopping mechanism and located at said discharge mechanism for detecting an improper discharging of the cards.

34. In a machine of the kind described, means for delivering sheets or cards in succession, feeding mechanism therefor, operating mechanism including cutters for separating said sheets into a plurality of strips or cards, deflectors for deflecting a portion thereof in one direction, and the remainder in another direction, an electric circuit, a detector in the path of one portion of said cards, said detector including a part projecting from a rock-shaft, the rocking of said shaft by said detector serving to bring said electric circuit into operation, a clutch mechanism and trip therefor, the operation of said clutch member stopping the further feeding of cards to the machine.

35. In a machine of the kind described, means for delivering sheets or cards in succession, feeding mechanism therefor, punching mechanism and cutting mechanism, detectors in the path of said cards, a clutch controlling the delivery of cards to said feeding mechanism, and an electric circuit actuating said clutch and controlled by said detectors, whereby the improper passage of a card serves to operate the adjacent detector and thereby automatically stop the further feeding of cards to the machine.

36. In a machine of the kind described, feeding mechanism for feeding sheets or cards in succession, operating mechanism to operate on said sheets or cards, counter apparatus actuated by the passage of successive sheets or cards, a magazine for receiving the cards from the machine, and a gate against which said cards rest in said magazine by gravity, and means actuated by the counter apparatus for operating said gate.

In testimony whereof I have signed my name to this specification in the presence of two subscribing witnesses.

DAVID E. HUNTER.

Witnesses:
  GEO. H. MAXWELL,
  GEO. W. GREGORY.